No. 852,208. PATENTED APR. 30, 1907.
G. S. WARD.
CAKE MACHINE.
APPLICATION FILED AUG. 29, 1906.
6 SHEETS—SHEET 1.
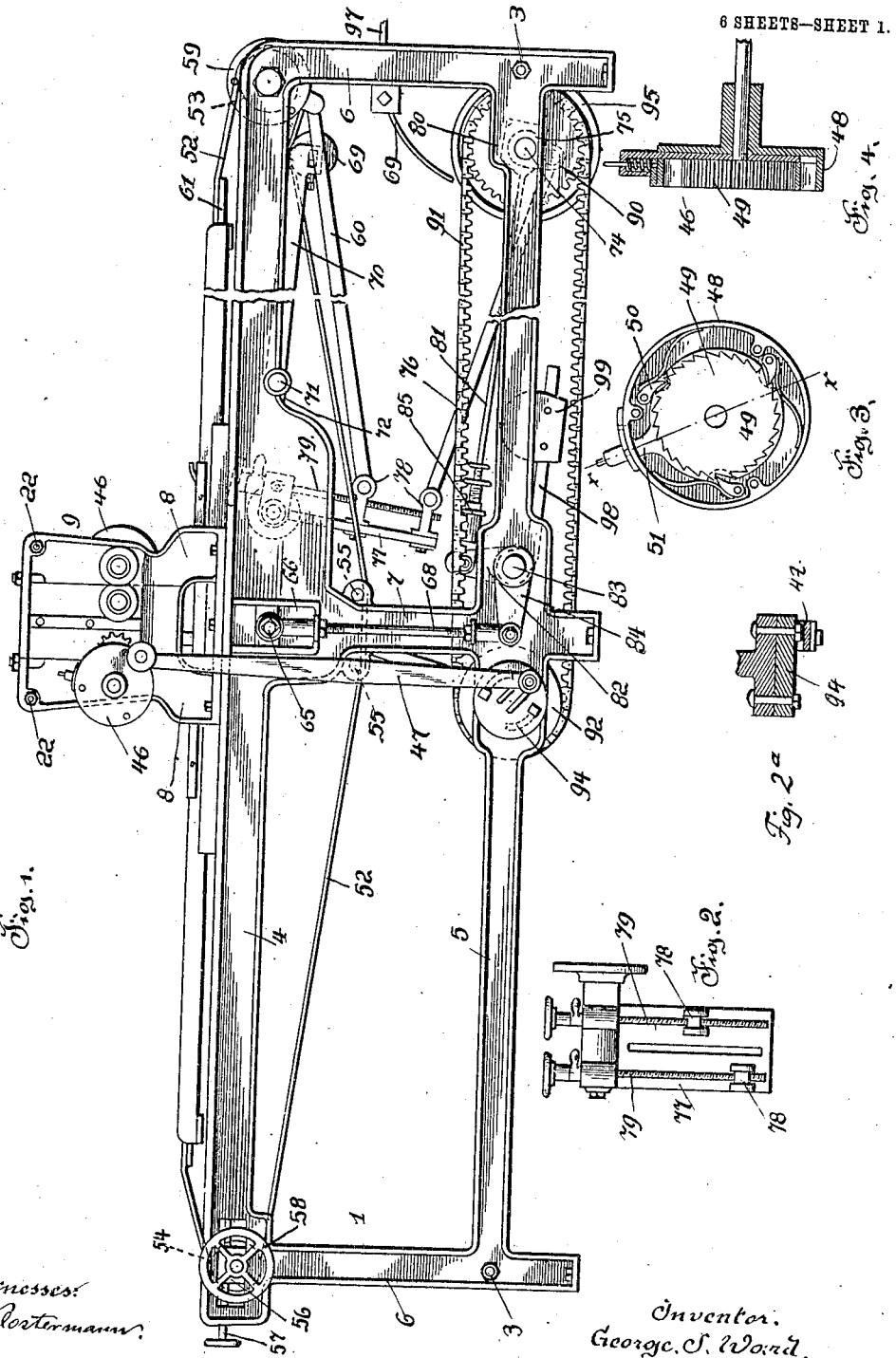
Witnesses:
C. Klostermann
A. H. Butler
Inventor.
George S. Ward.
by Attorneys.

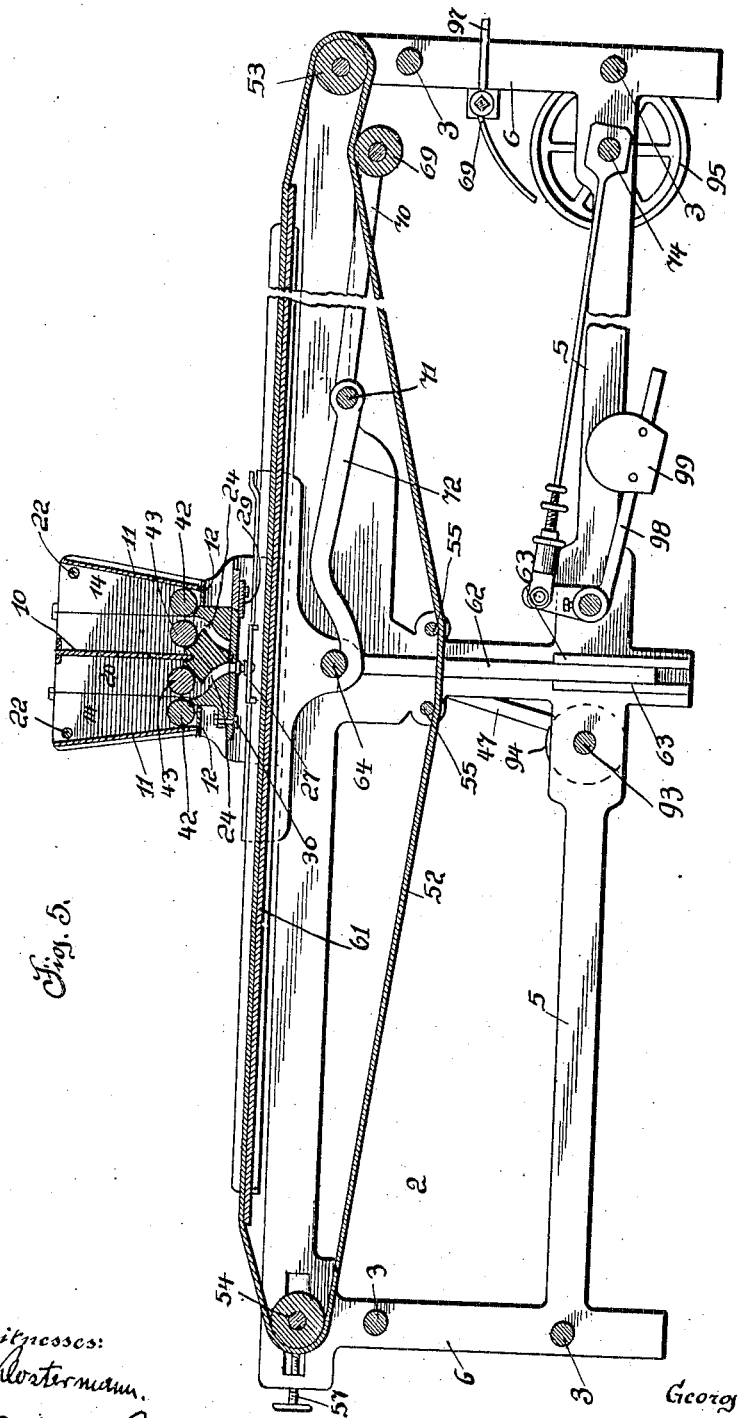

No. 852,208. PATENTED APR. 30, 1907.
G. S. WARD.
CAKE MACHINE.
APPLICATION FILED AUG. 29, 1906.
6 SHEETS—SHEET 3.
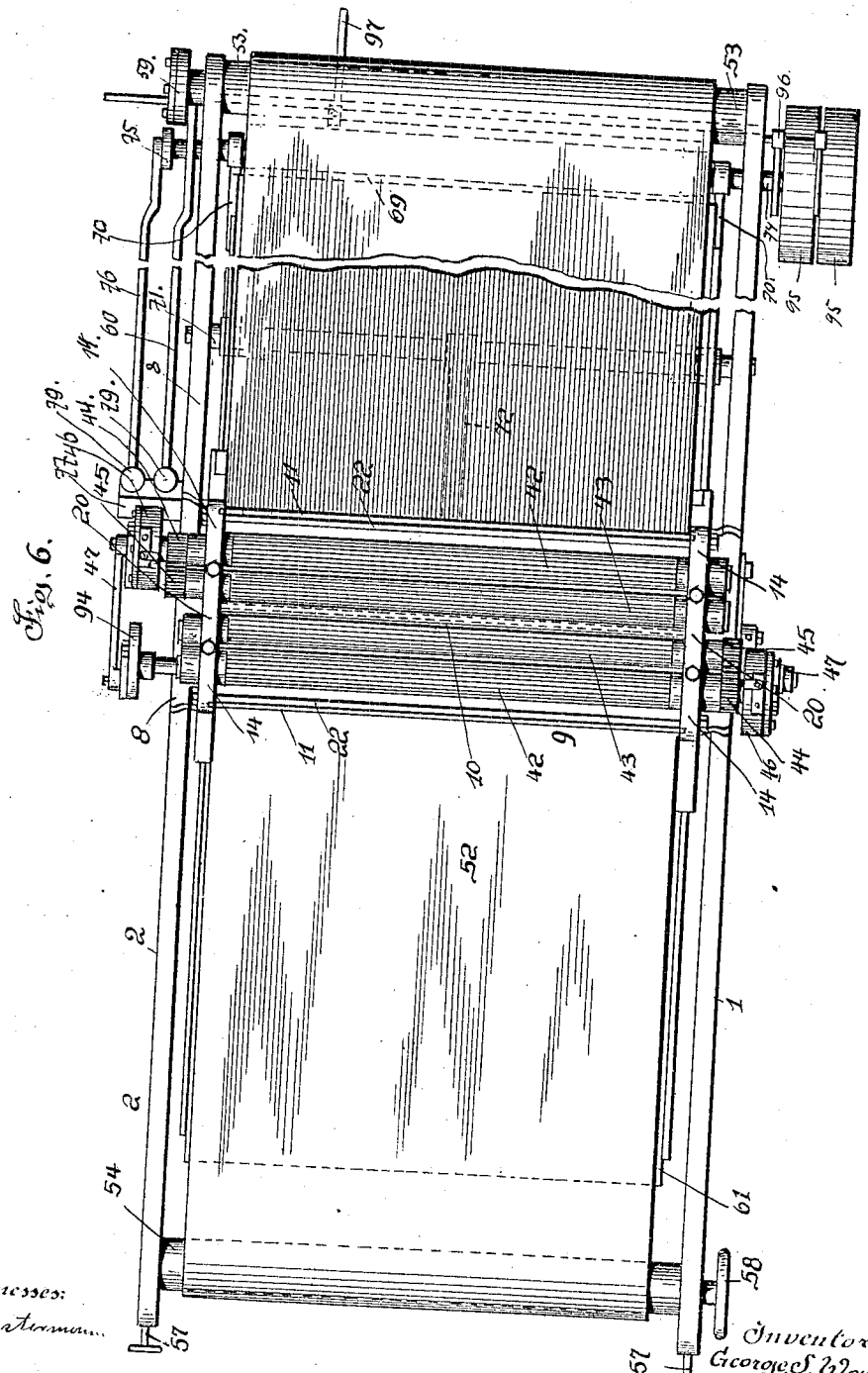

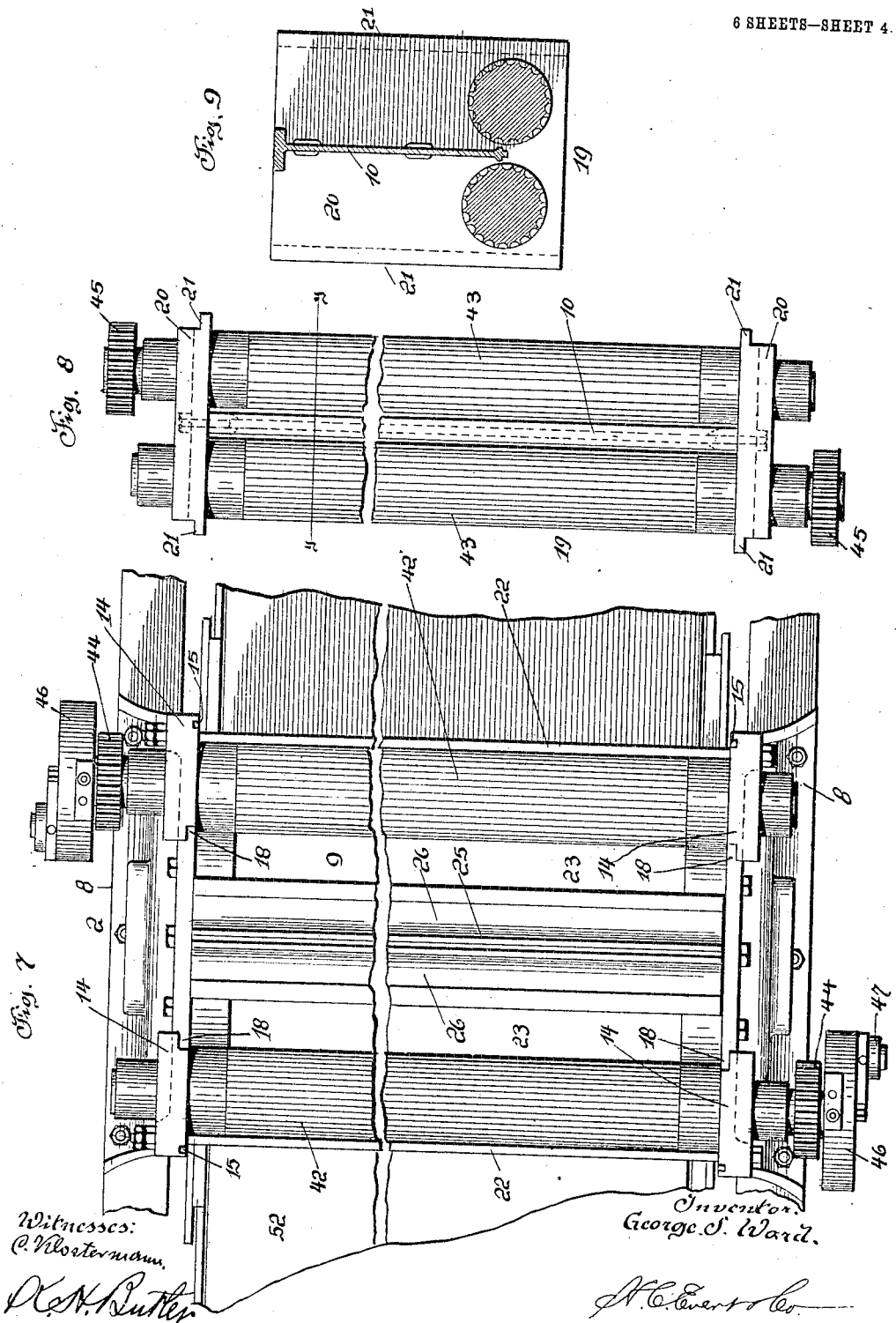

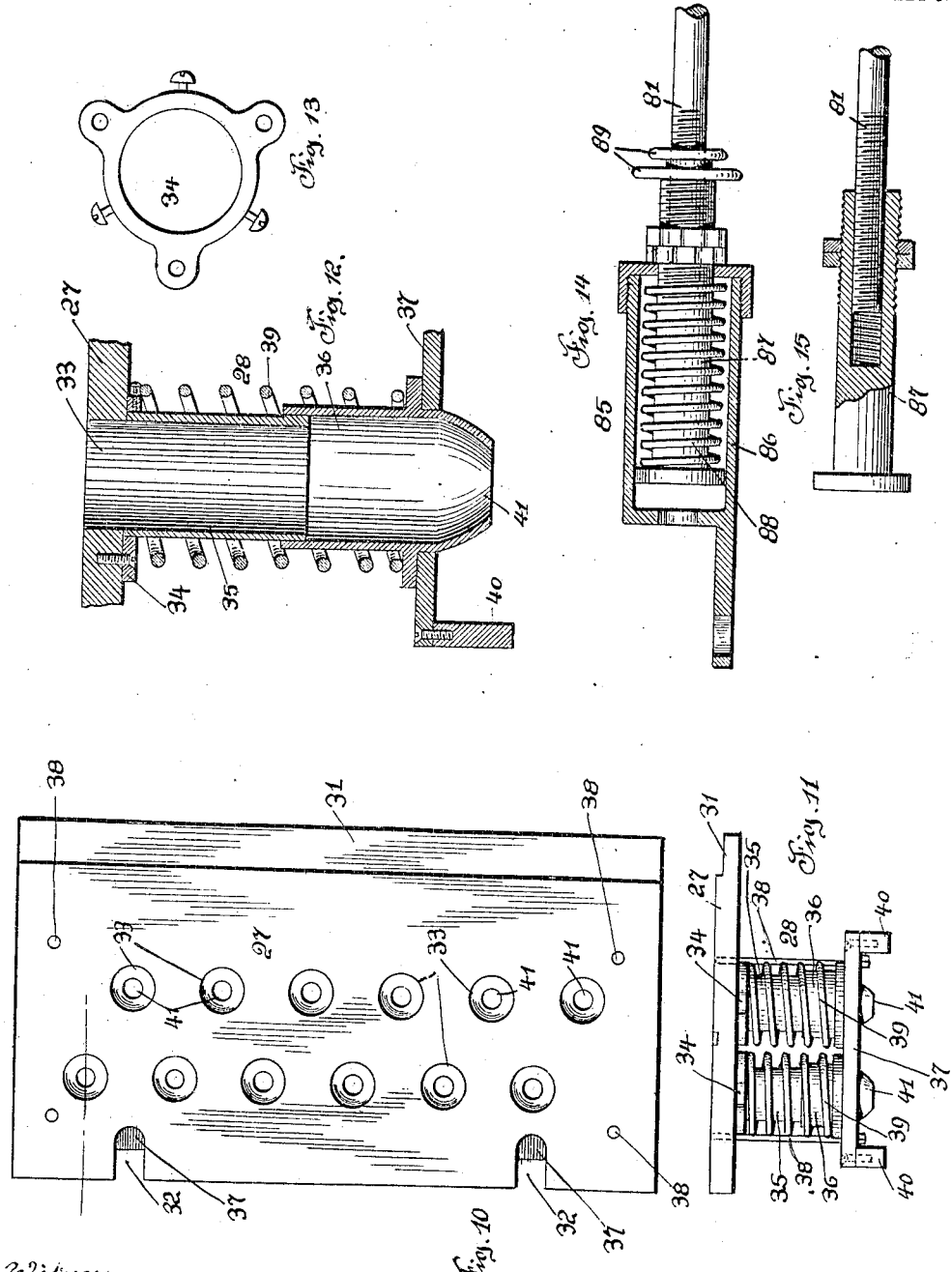

No. 852,208.
PATENTED APR. 30, 1907.
G. S. WARD.
CAKE MACHINE.
APPLICATION FILED AUG. 29, 1906.
6 SHEETS—SHEET 6.
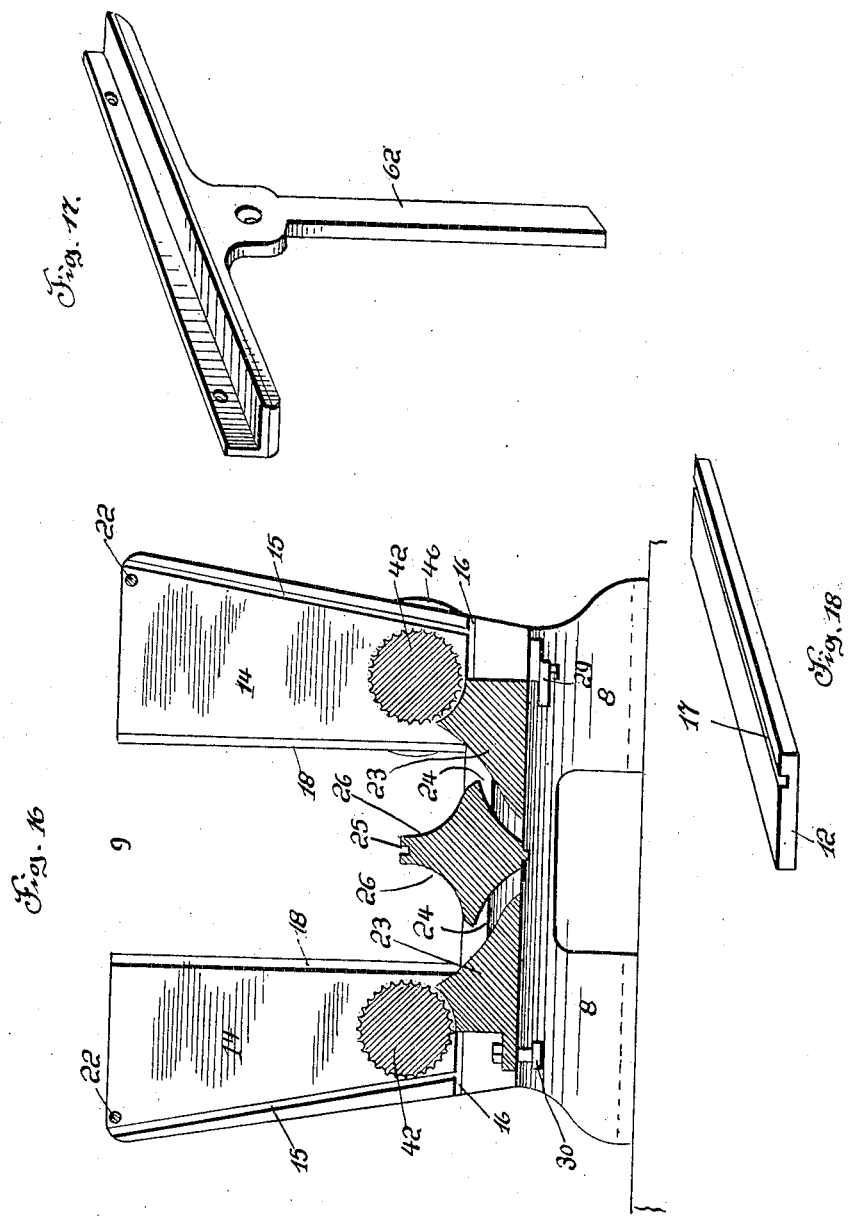

UNITED STATES PATENT OFFICE.

GEORGE S. WARD, OF PITTSBURG, PENNSYLVANIA.

CAKE-MACHINE.

No. 852,208.　　　Specification of Letters Patent.　　　Patented April 30, 1907.

Application filed August 29, 1906. Serial No. 332,548.

*To all whom it may concern:*

Be it known that I, GEORGE S. WARD, a citizen of the United States of America, residing at Pittsburg, in the county of Allegheny and State of Pennsylvania, have invented certain new and useful Improvements in Cake-Machines, of which the following is a specification, reference being had therein to the accompanying drawing.

This invention relates to cake machines, and more particularly to a machine for depositing quantities of dough upon pans or similar receptacles.

The invention has for its object to provide a machine designed for depositing predetermined quantities of dough upon pans, or a layer or quantity of substance on the top of cakes previously formed, such as marshmellow, jelly or a like soft-substance. By the novel construction of the machine, two or more mixtures or colors of substance can be simultaneously deposited upon cakes or two or more doughs can be deposited upon a pan to form cakes.

The invention primarily aims to combine a cake forming machine and a cake icing machine, to greatly facilitate the making of cakes, cookies and the like.

To this end, the invention aims to provide a machine comprising positive and reliable means for effecting a perfect formation of a mixture upon a pan or a cake carried by a pan. In this connection, the invention is intended to expeditiously produce large quantities of cakes, the mechanism employed to accomplish this result being positive in its action, and free from danger of injury by ordinary use.

The machine as an entirety primarily involves in combination an endless apron mechanism having a spasmodically actuated elevating device for raising and lowering a portion of the apron, and a ratchet device for intermittently moving said apron, a dough or mixture hopper having an intermittently mixture-feeding mechanism, and an interchangeable die-plate having means for positioning, temporarily holding, releasing and delivering a quantity of dough or mixture to receptacles carried by the interminable apron.

The above elements, together with their respective mechanisms will be hereinafter described in detail, and specially pointed out in the claims.

In describing the invention in detail, reference will be had to the accompanying drawings, forming part of this specification, and wherein like numerals of reference will be employed to designate corresponding parts throughout the different views, in which:—

Figure 1 is a side elevation of my improved machine, Fig. 2 is a front elevation of a rocker-arm constituting a part of the apron-actuating mechanism, Fig. 2$^a$ is a detail view of disk used with the machine. Fig. 3 is an elevation of the interior mechanism of a ratchet employed in connection with the mixture feeding mechanism, Fig. 4 is a vertical sectional view of the same taken on the line $x$—$x$ of Fig. 3, Fig. 5 is a longitudinal sectional view of the machine, Fig. 6 is a plan of the same, Fig. 7 is an enlarged fragmentary plan of the dough or mixture hopper, the inner driven rolls thereof being removed, Fig. 8 is a plan of the inner driven roll of the hopper, Fig. 9 is a transverse vertical sectional view of the same taken on the line $y$—$y$ of Fig. 8, Fig. 10 is a plan of a detachable die-plate adapted to be supported from the hopper of the machine, Fig. 11 is an end view of said plate, Fig. 12 is an enlarged vertical sectional view of one of the dies of said plate, Fig. 13 is plan of a die holding ring, Fig. 14 is a longitudinal sectional view, partly in elevation, of a pitman-rod stroke adjuster, Fig. 15 is a similar view of a portion of the same, Fig. 16 is a vertical sectional view of the hopper of the machine, the inner driven rolls thereof being removed, Fig. 17 is a perspective view of a vertically reciprocating frame, constituting a portion of the apron elevating device, Fig. 18 is a similar view of one of the detachable bottom plates of the hopper, To put my invention into practice, I provide a suitable support for the mechanism, a convenient form being shown in the accompanying illustration, and embodies two metallic side frames 1 and 2, secured together by tie-rods or stays 3, located at suitable places to give the desired rigidity to the frame support. Each side frame comprises top rails 4, bottom rails 5, vertical end standards 6 and intermediate standards 7.

Supported on the top rails 4 centrally of the machine by brackets or feet 8, is a dough or mixture hopper 9. As it is frequently desirable to place two different colored substances or two different mixtures in the hopper, it is preferable that this hopper be separated into two compartments, and when this is done, it is preferable that the dividing partition 10 be made removable, also the sides 11 and the bottom plates 12, this construction permitting of the hopper being easily cleaned. In carrying out this arrangement of parts, the end walls 14 are provided with inclined grooves 15 to receive the sides 11, and with horizontal grooves 16 to receive the bottom plates 12, said plates being grooved, as at 17, to receive the bottom edges of the sides 11. The end walls 14 are cut away to form guideways 18 to accommodate a roll housing 19, the end plates 20 of which are flanged, as at 21, and carry the partition 10. To brace the end walls 14, the tie-rods 22 are employed, and in connection with a feed plate 23, form a rigid structure upon the side frames 1 and 2. The feed plate 23 is formed with converging curved slots 24 longitudinally of said plate, and between the slots is a central transverse grooved support 25 for the partition 10. The sides of said support are curved, as at 26 to receive the inside pair of feed rolls to be hereinafter described. This feed plate acts as a scraper to remove the dough from the rolls.

From the slots 24, the contents of the hopper pass through a die-plate 27 and spring dies 28. The feed plate 23 at its transverse edges is provided with a guide-way or cleat 29 and depending bolts 30, the edge 31 of the die plate fitting in the guide-way 29, while the bolts 30 engage in slots 32, formed in the opposite edge of the die plate. By this construction, the die plate 27 can be readily removed to permit of various other die plates being used, where cakes of various sizes and configurations are to be made. In the die-plate is formed a plurality of openings 33, said openings being arranged in two rows to aline with the slots 24 of the feed plate 23. Suspended from the plate 27 by holding rings 34 are sleeves 35, these sleeves together with sleeves 36 constituting the dies 28. The sleeves 36 telescope the sleeves 35 and are supported upon a plate 37 loosely suspended by bolts 38 from the die plate 27. Surrounding said sleeves are coiled springs 39, said springs normally holding the plate 37 at the lower ends of the bolts 38. Secured to the transverse edges of the plate 37 are depending bars 40, the object of which will be presently described.

To temporarily retain the contents of the hopper 9 within the dies 28, the lower ends of the sleeves 36 are contracted, as at 41, the contents being partially ejected when the plate 37 is elevated. To facilitate the passage of dough or a mixture in the slots 24, I journal corrugated rolls 42 in the end walls 14 of the hopper, and similar rolls 43 in the end plates 20 of the roll housing 19, the confronting rolls being revolved toward one another and toward the slots 24 of the hopper. The one end of each roll is provided with a gear wheel, the gear wheels 44 of the rolls 42 meshing with the gear wheels 45 of the rolls 43.

Upon the ends of the rolls 42 contiguous to the gear wheels 44 are mounted box ratchets 46 (see Figs. 3 and 4) these ratchets being operated by connecting-bars 47 eccentrically and adjustably connected to the outer sides of the casings 48 of said ratchets. The ratchets are of a conventional form consisting of a ratchet-wheel 49, a spring-held pawl 50 and a spring pressed locking stirrup 51, these parts being assembled to impart an intermittent movement to the rolls 42 and 43.

The construction of the hopper as above described, permits of one compartment of the hopper being used independent of its associate compartment, and allows the die plate 27 to be replaced by a plate containing dies that can be fed from both of the slots 24. It is, therefore, apparent that cakes can be produced composed of two kinds of dough or mixtures, each of which is separate until fed into the dies of the die-plate.

Reference will now be had to an endless apron 52, employed for carrying pans or trays upon which the dough or cake mixture is deposited, these pans being conveyed from the front end of the machine, to the rear end thereof, and temporarily held and elevated beneath the hopper of the machine. The endless apron or belt 52 is frictionally mounted upon rollers 53, 54 and 55 journaled in the side frames 1 and 2 of the machine. The roller 54 is journaled in bearing blocks 56 adjustably mounted by hand-screws 57. The one end of the roller is provided with a hand-wheel 58, whereby the apron can be manually moved at any time. The rollers 55 simply serve as guide-rollers, while the roller 53 acts as a drive roller for the apron. The end of this roller is provided with a simple box ratchet 59, which is oscillated by a pitman-rod 60, to move the apron 52.

The device employed for raising and lowering that portion of the apron beneath the hopper 9 comprises a vertically reciprocating table 61, said table being approximately the same length as the machine and supported in a horizontal plane beneath the apron 52. The table is supported and guided in its movement by T-shaped legs 62, the lower ends of said legs being slidably mounted upon the inner sides of the frames 1 and 2 between guides 63 carried thereby. Extending through the legs 62 near the table top is a shaft 64, the ends 65 protruding through the slots 66 formed in the upper ends of the intermediate standards 7 of the frames 1 and 2. The ends of the shaft 64 are provided with guide blocks 67, which slide in the slot 66, and the extreme ends of the shaft serve functionally as trunnions to which are connected adjustable pitman-rods 68.

To maintain a frictional engagement between rollers 53, 54, 55 and apron 52, and at the same time allow the apron to be raised by the table 61, I employ a compensating device embodying an adjustable tightening roller 69, said roller being journaled between arms 70 carried adjacent to the ends of a shaft 71, revolubly mounted above the apron 52, between the frames 1 and 2. The shaft 71 is provided with a central rearwardly extending arm 72 adapted to engage the transverse shaft 64 carried by the legs 62 of the table 61. When the table is raised, that portion of the apron resting upon the tightening roller is lowered. Now, to operate the pitman-rods 60, 68 and connecting bars 47, I employ a mechanism which is driven from a shaft 74. The one end of the shaft 74 carries a crank arm 75, which is connected by a rod 56 to a rock arm 77 pivotally mounted upon the frame 1. The rock arm 77 is provided with adjustable blocks 78 to which the pitman-rod 60 and rod 76 are pivotally connected. The blocks 78 are adjusted by screws 79.

The shaft 74 adjacent to crank arm 75 is provided with an eccentric 80, said eccentric connecting by a rod 81 with a crank arm 82, carried by a shaft 83 journaled in the rails 5 of the frames 1 and 2. The shaft 83 has its ends provided with crank arms 84, to which the pitman-rods 68 are adjustably connected. The rod 81 is provided with a stroke adjuster 85 (see Figs. 14 and 15) consisting of a cylindrical casing 86, housing a barrel 87. Surrounding the barrel 87 is a spiral spring 88, which cushions the forward stroke of the rod 81. The end of the rod is adjustably mounted in the barrel and retained therein by lock nuts 89.

To operate the connecting bars 47, the shaft 74 is provided with a central sprocket wheel 90 and passing over said wheel is an endless chain 91, which also embraces a sprocket wheel 92 mounted upon a shaft 93, journaled in the rails 5 of the frames 1 and 2, adjacent to the intermediate standard 7. Mounted upon the ends of the shaft 93 are disks 94 to which the ends of the bars 47 are eccentrically and adjustably connected.

The end of the shaft 74 protruding from the side frame 2 is provided with belt pulleys 95 by which the shaft 74 is driven. In order that the machine, when in operation may be easily and quickly stopped by an operator at the forward end of the machine, I mount a conventional form of belt shifter 96 between the frames 1 and 2, said shifter having an arm 97 by which it can be actuated by the limb of the operator.

When the machine is in operation, the operator stands at the forward end of the machine and places the pans or trays upon the apron 52. As the apron is intermittently moved, the pans will be temporarily held stationary a number of times beneath the hopper 9. It is during this interval that the apron is elevated through the medium of the vertically reciprocating table 61, to allow a pan to receive a deposit of dough from the hopper 9. When the apron and table are elevated, the pan carried by the apron strikes the bars 40 of the dies 28 and elevates the sleeves 36 of said dies, causing a quantity of dough to be precipitated upon the pan. The rolls 42 and 43 are adjusted to operate in unison with the elevating of the apron 52, whereby a quantity of dough will be moved into the slots 24. This is accomplished through the medium of the disks 94, (see Figs. 1 and 2ª) which are adjusted by the bolts 94ª of said disk. Immediately upon the table, apron and pan receding, the sleeve 36 and bars 40 assume their normal position, confining the plastic dough until the table 61 is again actuated through the medium of the pitman-rods 68, crank shaft 83 and eccentrics 80. To facilitate a rapid withdrawal of the pans from the bars 40 and thus sever the dough, I provide the crank shafts 83 with a lever 98 carrying an adjustable weight 99. After the table 61 has receded, the apron 52 upon the table is moved a prescribed distance and again elevated to allow another row of deposits to be made upon a pan. When the pan has been filled, it is conveyed to an oven (not shown) located in close proximity to the machine. During the above operation, the dough or mixture contained within the hopper is automatically fed to the spring dies 28 of said hopper.

The machine thus far has been described as a cake-making machine, but it is obvious that by certain adjustments, the machine can be readily used as an icing machine. To this end, the pitman-rods 68 are regulated to raise the cakes placed in a pan or upon the apron, a prescribed distance in order that a proper coating may be placed upon the cakes. The connecting bars 47 are also adjusted at the disks 94, to properly feed the icing or coating to the dies 28.

It will be apparent from the foregoing description that I have devised a novel cake machine for expeditiously forming cakes, and I desire it to be understood that such changes in the arrangement of operating mechanism as are permissible by the appended claims, may be resorted to without departing from the spirit and scope of the invention.

What I claim and desire to secure by Letters Patent, is:—

1. In a cake forming machine, the combination with suitable supporting frames, of a stationary hopper carried by said frames, spring dies supported from said hopper and communicating with the interior of said hopper, an endless intermittently movable apron arranged between said frames, a vertically reciprocating table mounted between the lateral portions of said apron and adapted to elevate said apron to engage said dies, means to feed the contents of said hopper to said dies, means to move said apron, means to move said table, and compensating means operating simultaneously with the elevating and lowering of the table to provide for the tightening and slack in the apron due to the elevating and lowering of said table, substantially as described.

2. In a cake forming machine, the combination with suitable supporting frames, of a stationary hopper carried by said frames, spring dies supported from said hopper and communicating with the interior of said hopper, an endless intermittently movable apron arranged between said frames, a vertically reciprocating table mounted between the lateral portions of said apron and adapted to elevate said apron to engage said dies, an apron tightening roller actuated by the movement of said table, means to feed the contents of said hopper to said dies, and means actuated from a revoluble shaft to operate said apron and table, substantially as described.

3. In a cake forming machine, the combination with suitable supporting frames, of a stationary partitioned hopper carried by said frames, spring dies loosely supported from said hopper and communicating therewith, an endless apron mounted between said frames, a table adapted to engage said apron, a tightening roller engaging said apron, means to reciprocate said table, means actuated by said table to move said roller, and means to intermittently move said apron, substantially as described.

4. In a cake machine, the combination with suitable frames, of a stationary partitioned hopper carried by said frames, spring dies loosely supported from said hopper, corrugated revoluble rolls journaled in said hopper and adapted to force the contents of said hopper into said dies, an apron movably mounted beneath said hopper, a table adapted to elevate a portion of said apron to engage said dies, a tightening roller engaging said apron, and lowered by said table when said table is raised, means to intermittently move said apron, and means to simultaneously move said table and said rolls, substantially as described.

5. In a cake machine, the combination with suitable frames, of a stationary partitioned hopper carried by said frames, spring dies loosely supported from said hopper, corrugated revoluble rolls journaled in said hopper and adapted to force the contents of said hopper into said dies, and intermittently movable apron mounted beneath said hopper, a tightening roller engaging said apron, means to alternately raise said apron and said roller, and means to revolve said rolls, substantially as described.

6. In a cake machine, a hopper to receive dough, spring dies carried thereby, an apron to carry dough from said dies, means for elevating said apron to engage said dies, revoluble means working in said hopper to force dough into said dies, and means actuated by the first named means to loosen said apron when raised, substantially as described.

7. In a cake machine, a hopper, removable spring dies resiliently supported by said hopper, an intermittently movable apron adapted to engage said dies, a tightening roller engaging said apron, and means to alternately move said apron and tighten said apron, substantially as described.

8. In a machine of the type described, a stationary hopper, an apron arranged beneath said hopper and carried upon revoluble rollers, a table adapted to elevate a portion of said apron, and means to relieve the tension of said apron when raised, substantially as described.

9. In a machine for placing deposits on cakes or pans, a vertically reciprocatory table, an endless apron traveling over said table, a tightening roller engaging said apron, actuating means for said table, and means actuated by said table to move said roll, substantially as described.

10. In a machine of the type described, a hopper, an endless apron traveling beneath said hopper, means to raise a portion of said apron, and means actuated by the first named means to release a portion of said apron, substantially as described.

11. In a cake machine, a supporting frame, a vertically movable table, means for operating said table, an intermittently-movable apron, and means for intermittently-actuating the said apron, in combination with a dough hopper mounted on the frame and having removable roll-housings, a removable partition in said dough hopper, feed rolls in said dough hopper journaled all in the same plane and two of which are journaled in the removable roll-housings and are removable from the hopper therewith, and means for operating said feed rolls.

12. In a cake machine, a vertically movable table, means for operating said table, an intermittently movable endless apron, means for operating said apron, in combination with a dough hopper having removable roll-housings and a removable partition, feed rolls carried by the removable roll-housings of the dough hopper and removable from the hopper with said housings, coacting feed rolls journaled in the stationary part of the dough hopper, all of said feed rolls being journaled in the same plane, and means for driving said rolls in unison.

13. In a cake machine, a dough hopper having a removable partition, and removable roll-housings, feed rolls journaled in the end walls of the dough hopper, coacting feed rolls journaled in the removable roll-housings, and removable from the hopper with said roll-housings, all of said rolls being journaled in the same plane, and means for driving said rolls.

14. In a cake machine, a dough hopper having a removable partition and removable roll-housings, feed rolls journaled in the stationary end walls of the dough hopper and removable from the hopper with said roll-housings and coacting feed rolls journaled in the removable roll-housings of the dough hopper, all of said rolls being journaled in the same plane.

15. In a cake machine, a dough hopper provided with a removable partition, with removable-roll housings constituting a part of the end walls of the hopper, and with removable side walls, rolls journaled in the dough hopper end walls and in the removable roll housings and arranged in pairs, the rolls of each pair being in the same plane, and means for driving one pair of rolls at a greater rate of speed than the other pair of said rolls.

16. In a cake machine, a vertically movable table, means for operating said table, an endless apron traveling over the table, means for adjusting the tension of said apron, compensating means to provide for the elevating and lowering of the apron and means for intermittently operating the apron to move the same along the table.

17. In a cake machine, a dough hopper, having removable roll-housings constituting a part of the end walls of said hopper, feed rolls journaled in said roll-housings and removable from the hopper with said housings, coacting feed rolls journaled in another part of the end walls of the dough hopper, all of said rolls being journaled in the same plane, and means for operating said rolls.

18. In a cake machine, a vertically reciprocatory table, means for operating said table, an endless apron passing over the table, and compensating means operating simultaneously with the elevating and lowering of the table to provide for the tightening and slack in the apron due to the elevating and lowering of said table.

19. In a cake machine, a supporting frame, a vertically reciprocatory table, arms on which said table is mounted, a shaft carried by said arms, elevating rods connected to said shaft, means for operating said elevating rods to actuate the table, an intermittently movable apron, and a compensating roller for the apron to provide for the tightening and slack in the apron due to the elevating and lowering of the table.

20. In a cake machine, a vertically movable table, means for operating said table, an endless apron, intermittently movable over said table, means for intermittently operating said apron, means for adjusting the apron, and compensating means independent of the apron operating means and operating simultaneously with the elevating of the table to provide for the tightening of said apron due to the elevating thereof.

21. In a cake machine, a vertically movable table, means for operating said table, an endless apron intermittently traveling over the table, means for intermittently operating said apron, and compensating means operating independently of the apron operating means and simultaneously therewith to loosen the apron when the table is elevated and tighten the same when the table is lowered.

In testimony whereof I affix my signature in the presence of two witnesses:

GEORGE S. WARD.

Witnesses:
J. F. SCHALLERT,
T. W. MONTGOMERY.